United States Patent [19]

Bigler et al.

[11] 3,820,281

[45] June 28, 1974

[54] PRE-GERMINATION SEED TREATMENT

[75] Inventors: E. Ray Bigler, Tempe; Thomas L. Camp; Perry L. Nelson, both of Phoenix, all of Ariz.

[73] Assignee: American Bioculture, Inc., Plumsteadville, Pa.

[22] Filed: Mar. 2, 1973

[21] Appl. No.: 337,394

[52] U.S. Cl. .................. 47/58, 47/DIG. 5, 47/1.4, 71/71, 47/DIG. 9
[51] Int. Cl. .................. A01n 21/02, A01g 7/00
[58] Field of Search ........ 71/77; 47/58, 1.4, DIG. 9, 47/DIG. 5

[56] References Cited
UNITED STATES PATENTS

| | | |
|---|---|---|
| 3,444,647 | 5/1969 | Takahashi .......................... 47/1.4 |
| 3,462,360 | 8/1969 | McKinney .......................... 47/1.4 X |
| 3,546,812 | 12/1970 | Kobayashi et al. .................. 47/1.4 |
| 3,732,089 | 5/1973 | Megronigle ........................ 47/1.4 X |

*Primary Examiner*—Robert E. Bagwill
*Attorney, Agent, or Firm*—Synnestvedt & Lechner

[57] ABSTRACT

A method treatment of seeds by soaking in an aqueous medium containing the metabolites produced by green algae is disclosed. The culture is harvested during the early logarithmic phases of growth of the algae but after a cell density of about $1 \times 10^5$ cells per milliliter is reached. Rice, corn, and other seeds such as lettuce and barley treated with the invention exhibit more rapid root initiation, faster root establishment and larger quantities of roots per seedling. Increases in shoot weight and length also are observed.

7 Claims, No Drawings

PRE-GERMINATION SEED TREATMENT

BACKGROUND OF THE INVENTION

This invention relates to methods of treatment utilizing algal products.

In particular, the invention relates to a method of treating seeds with algal products having useful growth promoting effects.

The invention is based on the recognition that a healthy culture of algae of the genus chlorella produces by-products which exhibit growth regulating effects characteristic of auxins during a certain phase of their growth cycle. By harvesting the culture at the appropriate time in the growth cycle and when cellular density has reached a predetermined level, a product is obtained which is usefully employed in the soaking of rice, barley, corn and other seeds prior to planting.

As is known by those of ordinary skill in the art, auxins are growth regulators of the kind which have the capacity for inducing elongation in shoot cells in the manner of indoleacetic acid. Among the important effect of auxins are the induction of root development and epicotyl development. It is known that auxins can either promote or inhibit growth of any given plant organ, some organs being more sensitive than others. Thus in a treatment operation, auxin concentration is somewhat critical.

By way of an example, an auxin concentration of $10^{-11}$ molar the growth of roots whereas $10^{-9}$ molar will inhibit the growth of roots.

The invention is based on the discovery that auxin concentrations which beneficially and significantly influence development of roots and epicotyls are present in chlorella cultures when harvested during the logarithmic stage of growth when cell population reaches about $10^5$ cells/ml.

Another important object of the invention is the provision of a novel method for treating seeds.

Another important object of the invention is the provision of a product useful for the pregermination treatment of seeds.

A still further object of the invention is the provision of a method for treating seeds which stimulates root and shoot development.

How the foregoing and other objects are achieved will become more apparent from the detailed description of the illustrative embodiment of the invention which follows.

Although certain beneficial effects of the invention are achieved utilizing other green algae, the preferred alga is of the genus Chlorella and preferably the species Chlorella pyrenoidosa. This species is a commonly occurring one and can be grown under a relatively broad range of environmental conditions. Considerable literature exists reporting on the growth of this species.

In carrying out the invention, cultures of Chlorella pyrenoidosa were grown in an aqueous medium to which was added a nutrient solution suitable for growth. In the examples of the invention which follow, the nutrients are furnished by a serum which is a fermented extract of cow manure. This is of special advantage in carryong out the objects of the invention inasmuch as the nutrients are inherently balanced to favor the production of growth regulating and flocculating compounds. Moreover, it has been found that Chlorella pyrenoidosa is normally present in the serum, so that the serum acts as a seed material as well as a nutrient base for producing cultures according to the invention.

Although other methods of serum production may be used, reference is made to Wade U.S. Pat. No. 3,108,868 for a method of preparation of serum which is satisfactory for the purposes of this invention. The undiluted supernatent fluid of that patent is the substance sometimes herein referred to as serum.

An analysis of serum of the type used shows the following composition:

| | | |
|---|---|---|
| Total Phosphorus | mg/l | 35 |
| Total Phosphate | mg P/l | 29 |
| Orthophosphate | mg P/l | 18 |
| C.O.D. | mg O/l | 1580 |
| Total Kjeld. N | mg N/l | 488 |
| Ammonia | mg N/l | 380 |
| pH | | 9.0 |

A culture suitable for the purposes of the invention is prepared by adding one part of serum to about 20 parts of water. This mixture is allowed to stand for 3 to 5 days at which time a quantity of water equal to the initial quantity of water should be added.

Within 24 to 48 hours after the addition of the second quantity of water, the mixtures should begin to have a definite green appearance. At this time, additional quantities of water equal to the initial quantity may be added until the tank is full. With each addition of water, about one part of serum to 1,000 parts of water is preferably added.

In addition to the nutrients, as is understood in the art, the culture should be exposed to adequate light and maintained at a moderate temperature in order to maximize photosynthetic action. An adequate supply of carbon dioxide is required. Good dense cultures suitable for harvesting are typically obtained in about 8–10 days when cultured at a temperature of about 25° C when exposed to artificial light having an intensity of at least 400 foot-candles at the surface of the pool. Preferably, the culture pool is agitated to insure that as culture density increases, all of the culture is exposed to adequate light. 5 percent carbon dioxide in air may also be bubbled through the mass.

Although other sources of artificial light or even natural sunlight will produce satisfactory results, it is preferred to use a quartz iodide lamp provided with a red filter, which absorbs the high frequency red and infrared light. The filtering of the light in the infrared range is important in that it prevents the warming up of the culture by the light source. When adequate illumination is provided, it is preferred that the temperature be maintained at about 20° C and no higher than about 30° C. Maximum growth rate has been found to take place at about 25° C. At temperatures above 30° C, the environment is more favorable to organisms other than chlorella. Substantially no growth takes place below about 15° C.

Cultures grown in accordance with the above techniques, grow in logarithmic fashion for a period of time which may in a typical case range from about 5 to more than 10 days. During this phase, rapid cell division takes place. As the culture continues to increase in density, as determined by the number of cells but later on also by cell size the rate of progression slacks off and enters a stationary phase due mainly to depletion of nitrogen in the nutrient solution and the inability of light to penetrate the medium. The length of the logarithmic phase can be extended somewhat by the supplemental addition of serum and by optimizing the amount of light, carbon dioxide and temperature as discussed above. When cultures are grown on a serum base with adequate light and optimum temperature and $CO_2$, densities of $10^7$ to $10^8$ or even higher are obtained before growth slacks off.

Throughout the logarithmic phase of growth the pH of the mixture should rise because of the chemistry of photosynthesis. A pH in the range of about 8.3 to about 9.5 indicates a healthy culture suitable for use.

Algal products exhibiting auxin-like activity are obtained by harvesting cultures grown in the above-described manner when the cultures are growing in a logarithmic fashion and preferably by harvesting the cultures before growth begins to slack off. In no event should the cultures be used after the stationary phase of growth is entered.

It is therefor preferred technique to harvest the cultures during the logarithmic phase of growth and preferably during the early or mid-logarithmic phase after culture the has reached a density of at least $1 \times 10^5$ cells/ml. Cultures having one or fewer population doublings per day should not be employed. The significance of this is that auxin-like effects of the product are observed relatively early in the life of the culture and taper off when growth slacks off. Although the reasons are not fully understood, it is theorized that the auxins are oxidized or consumed by the algae. It is also known that auxins are sensitive to light so that auxin activity may decrease rapidly after the stationary phase of culture is reached.

In accordance with one example of the invention, cultures were harvested prior to the late logarithmic stages of growth but when cell counts were between about $10^5$ to $10^7$ cells per ml. Seeds of rice and corn were soaked in the harvested culture for a period of about 18 hours. After this period the seeds were rinsed off with distilled water and placed in a pan containing ¾ inch squares of blotter paper. Water was applied to the blotter paper to the point of saturation plus an extra ¼ inch above the blotter paper.

The seeds were allowed to sprout at a temperature of about 28° C. When epicotyl height reached about 1 ½ inches, they were placed in a standard nutrient solution and allowed to grow for 12 days. Control seeds were soaked in tap water or commercially available indoleacetic acid solution. At day 12 all seedlings were measured for root length, root fresh weight per plant, shoot length and shoot fresh weight.

Root length of rice seedlings treated with algae cultures was 39 percent greater than those of water treated seeds. In comparison, a 33 percent increase over tap water treated seeds when seeds were treated with indoleacetic acid. Fresh root weight per plant of seedlings from seeds treated with algae cultures or with indoleacetic acid averaged 0.03 gms. Shoot weight of seedlings from tap water treated seeds averaged 0.02 gms. Shoot length of seeds treated with algae products averaged 10 cms. Shoot length of seedlings from seeds treated with indoleacetic acid averaged 11 cms. whereas shoot length of seedlings from seeds treated in tap water averaged 8 cms. Shoot weight for seedlings from seeds treated with culture averaged 0.04 gms. Indoleacetic acid treated seeds resulted in seedlings averaging 0.048 gms. whereas seedlings from tap water treated seeds 0.03 gms. All values are significant within the 1 percent by Duncan's Multiple Range Test.

In another example, field corn seeds were treated as above and compared with seeds treated in tap water. In the following table measurements were taken on 17 day old plants grown in environmental chambers under the same conditions.

TABLE I

| | Root Fresh Wt., g. | Shoot Fresh Wt., g. | Root Length cm. | Shoot Length cm. |
|---|---|---|---|---|
| Tap Water | 2.4999 | 6.2847 | 20.0 | 50.6 |
| | 3.3479 | 7.6721 | 23.9 | 54.3 |
| | 3.6366 | 6.5453 | 26.0 | 49.8 |
| | 2.6225 | 5.4784 | 22.9 | 47.5 |
| Average | 3.0267 | 6.4951 | 23.2 | 50.6 |
| Algae Cultures | Root Fresh Wt., g. | Shoot Fresh Wt., g. | Root Length cm. | Shoot Length cm. |
| | 4.6265 | 9.5792 | 28.6 | 64.8 |
| | 3.8077 | 5.6820 | 33.0 | 57.4 |
| | 2.8658 | 5.7812 | 26.8 | 60.0 |
| | 7.4141 | 16,5911 | 30.0 | 72.7 |
| Average | 4.6785 | 9.4083 | 29.6 | 63.7 |

Measurements made on 17 day old plants.

Following harvesting of the product, if storage for a prolonged period of time is necessary, the product should be shielded from light, and especially from light in the ultraviolet range as auxins are extremely light sensitive. The product should further be kept at a moderate temperature as for instance below 30° C.

The auxin activity has been observed to be present in filtrates of the algae cultures and if desired, the algae may be separated by filtration and the filtrate used for seed treatment purposes. For reasons of economy however, it is preferred that the culture in its aqueous medium be utilized in the pre-germination treatment of seeds.

Use of the invention in the treatment of rice seeds promotes faster seedling establishment thereby reducing drifting of the planted seed caused either by the movement of wind or water. For all seedlings more rapid development of roots and increases in the mass of the root system enables the plant to draw more nutrients from the soil thus giving more top growth. The incidence of seedling and root diseases appears to be reduced.

We claim:

1. A method of pre-germination treatment of seeds which comprises culturing green algae in an aqueous nutrient medium in the presence of light and carbon dioxide so that the culture grows in logarithmic fashion, and at a temperature of between about 20° C and about 30° C, harvesting the culture before the end of logarithmic growth after the cell population density reaches about $10^5$ cells per milliliter and applying the harvested culture to seeds prior to planting.

2. A method according to claim 1 wherein the alga comprises the genus Chlorella.

3. A method according to claim 2 wherein the alga comprises Chlorella pyrenoidosa.

4. A method according to claim 1 wherein the seeds are soaked for a period of about 18 to about 24 hours.

5. A method according to claim 2 wherein the culture is harvested prior to the late logarithmic stage of growth.

6. A method according to claim 1 further comprising the step of light shielding the harvested culture prior to use.

7. A method according to claim 6 further comprising maintaining the harvested culture below about 30° C prior to use.

* * * * *